United States Patent [19]

Ogasawara et al.

[11] Patent Number: 5,661,543
[45] Date of Patent: Aug. 26, 1997

[54] PHOTOSENSITIVE MATERIAL FEED MECHANSIM FOR AUTO-PRINTER'S EXPOSURE STATION

[75] Inventors: Mamoru Ogasawara; Sinobu Ono, both of Ohmiya; Shuji Tahara, Kanagawa-ken, all of Japan

[73] Assignees: Fuji Photo Film Co., Ltd., Kanagawa-ken; Fuji Photo Optical Co., Ltd., Saitama-ken, both of Japan

[21] Appl. No.: 394,024

[22] Filed: Feb. 22, 1995

[30] Foreign Application Priority Data

Feb. 25, 1994 [JP] Japan .................................. 6-053160

[51] Int. Cl.⁶ .................................................. G03B 27/52
[52] U.S. Cl. .................... 355/40; 355/39; 355/74
[58] Field of Search ............................. 355/39, 40, 72, 355/74

[56] References Cited

U.S. PATENT DOCUMENTS

| | | | |
|---|---|---|---|
| 4,184,764 | 1/1980 | Bailey et al. | 355/72 X |
| 4,766,492 | 8/1988 | Miyawaki | 355/74 X |
| 4,857,964 | 8/1989 | Pohlman et al. | 355/40 |
| 5,365,308 | 11/1994 | Ozawa et al. | 355/74 |

*Primary Examiner*—Fred L. Braun

*Attorney, Agent, or Firm*—Price, Heneveld, Cooper, DeWitt & Litton

[57] ABSTRACT

A photosensitive material feed mechanism for the exposure station of an auto-printer in which a forward end of a lith plate is formed with a guide structure without a need for an increased number of parts in a manner that a photosensitive material may be smoothly fed into the exposure station with a forward end of photosensitive material being guided by the above-mentioned guide structure when the mechanism is initially loaded with photosensitive material. A greeting card kit serving as the exposure station of the auto-printer includes a basic frame, upper and lower guide plates fixed to the basic frame, and a douser exposed externally of the greeting card kit. The lith plate is formed with a character zone exposure window and a picture zone exposure window in addition to the previously mentioned guide structure and is capable of being withdrawably inserted into the greeting card kit through the externally exposed douser. A feed path for the photosensitive material may be laid upon the guide structure to initiate feed of photosensitive material immediately after loading thereof. The photosensitive material may also be laid upon the respective exposure windows to achieve exposure of the photosensitive material to the respective zone. A forward end of the guide structure is formed with an edge function to wedge photosensitive material aside as the lith plate is inserted into the greeting card kit after the mechanism has been loaded with photosensitive material.

39 Claims, 7 Drawing Sheets

PHOTOSENSITIVE MATERIAL FEED MECHANSIM FOR AUTO-PRINTER'S EXPOSURE STATION

BACKGROUND OF THE INVENTION

1. Field of the Invention

The present invention relates to a mechanism for feeding photosensitive material, such as photographic paper, to an exposure station within a printing station of an auto-printer and, more particularly, to such mechanism useful with the exposure station loaded with a greeting card kit.

2. Description of the Related Art

A conventional auto-printer generally includes stations, such as a printing station and a processor station, wherein photographic paper is continuously fed from its roll to the printing station and exposed to an image recorded on original film, such as negative film in the exposure station.

Recently, a new type of photocard has come into wide use, which is a postcard or the like having a photographic picture printed on a part of its rear side and a greeting message printed in the margins surrounding the printed photographic picture. Sometimes the exposure station contained within the printing station of the auto-printer is loaded with the greeting card kit in order to print the photocard in the auto-printer. As will be apparent from FIG. 8 of the accompanying drawing, the greeting card kit 1 is adapted to receive a lith plate 2 withdrawably inserted thereinto and the lith plate 2 is formed with a picture zone exposure window 2a and a lith film mount frame 2b. The greeting card kit 1 is loaded with a continuous strip of photographic paper 3 in readiness for exposure and further feeding.

To perform operation of printing by the auto-printer loaded with the greeting card kit 1, the lith plate 2, carrying a lith film 4 having a greeting message or the like recorded thereon and mounted on the lith film mount frame 2b, is inserted into the greeting card kit 1 from the outside, as shown by FIG. 9. Then, photographic paper 3 is exposed to the characters or the like recorded on the lith film 4 followed by exposing photographic paper 3 to the picture zone of the lith film 4 through the picture zone exposure window 2a.

After photographic paper 3 has been initially loaded, the forward end of photographic paper 3 in the form of a roll is guided downward by a pair of guide rollers (not shown) provided above the greeting card kit 1 into this. When photographic paper 3 is fed to the greeting card kit 1 containing therein the lith plate 2, there is an apprehension that the forward end of photographic paper 3 might float off from the feed path as the forward end of photographic paper 3 reaches the picture zone exposure window 2a of the lith plate 2 because no guide member is provided for the forward end. If photographic paper 3 is further fed without correcting such condition, the forward end may be possibly caught by the lower edge of the picture zone exposure window 2a and photographic paper 3 may be prevented from being smoothly loaded. Also, when photographic paper 3 is fed into the greeting card kit 1 having the lith plate 2 withdrawn therefrom, photographic paper 3 may often be caught within the greeting card kit 1 since the greeting card kit 1 has no guide member therein.

To avoid this inconvenience, there has been proposed the arrangement, as shown by FIG. 9, according to which a pair of rails 5 extend in parallel to and between upper and lower guide plates 1a, 1b of the greeting card kit 1, i.e., in parallel to the direction in which the lith plate 2 is slidable. The rails 5 extend through respective guide holes 6a of a loading plate 6 so that this loading plate 6 may be slidably moved along the rails 5. Appropriate helical springs 7 are provided around the respective rails 5 and the loading plate 6 is fed to these helical springs 7 in the proximity of the respective guide holes 6a. In this manner, the loading plate 6 is set under the biasing force of the helical springs 7 to a position at which the loading plate 6 is laid upon photographic paper 3 as the lith plate 2 is withdrawn.

Accordingly, in order to load the greeting card kit 1 with photographic paper 3, an operator may withdraw the lith plate 2 from the greeting card kit 1 to set the loading plate 6 upon the feed path for photographic paper 3 so that the forward end of photographic paper 3 may be guided by the loading plate 6 and smoothly fed downward without floating off from the feed path.

Referring to FIG. 9, insertion of the lith plate 2 causes its forward end to push the loading plate 6 against the biasing force of the helical springs 7 until the loading plate 6 retracts from the position at which the loading plate 6 has been laid upon the feed path for photographic paper 3. Thus, the photographic paper 3 is ready to be exposed without any interference.

However, the above-mentioned greeting card kit, according to the prior art, includes relatively many members, such as the slidable loading plate 6 and the helical springs 7, leading to the correspondingly increased number of parts. With such arrangement of the prior art, therefore, it is often difficult to minimize the size, as well as the weight of the greeting card kit 1, to simplify the manufacturing process, and to reduce the manufacturing cost.

In view of this problem, it is an object of the invention to provide a photosensitive material feed mechanism for the exposure station of an auto-printer that is improved in a manner that, for initial loading of the photographic paper, the forward end thereof can be reliably guided and smoothly fed.

After a predetermined number of printings have been completed, the lith plate 2 is withdrawn from the greeting card kit for exchange of the lith film 4 even though photographic paper 3 remains loaded therein. However, reinsertion of the lith plate 2 may often cause trouble such that the forward end of the lith plate 2 is caught by a side edge of photographic paper 3 and thereby obstruct the desired smooth operation.

In view of this problem, it is another object of the invention to provide a photosensitive material feed mechanism for the exposure station of an auto-printer that is improved so that both the insertion and the withdrawal of the lith plate can be smoothly performed even if the photographic paper remains loaded therein.

SUMMARY OF THE INVENTION

To achieve the objects set forth above, the invention generally resides, according to an aspect, in a photosensitive material feed mechanism for the exposure station of an auto-printer, wherein the mechanism includes an exposure station serving for exposure of photosensitive material successively fed thereto and adapted to receive an exposure plate withdrawably inserted thereinto. The exposure plate is formed with an exposure window and photosensitive material guide means, wherein, depending on an insertion depth of the exposure plate, the mechanism can be switched between a state in which the exposure window is laid upon photosensitive material in readiness for exposure and a state in which photosensitive material guide means is laid upon a feed path for the photosensitive material for loading of photosensitive material.

The invention resides, according to another aspect, in a photosensitive material feed mechanism for the exposure station of an auto-printer, wherein the mechanism making up the exposure station serves to expose photosensitive material successively fed thereto and is adapted to receive an exposure plate withdrawably inserted thereinto. The exposure plate is formed with an exposure window, photosensitive material guide means, and photosensitive material wedge-aside means. The photosensitive material wedge-aside means functions to wedge photosensitive material aside as the exposure plate is inserted into the exposure station to which photosensitive material is being fed. In this manner, depending on an insertion depth of the exposure plate, the mechanism can be switched between a state in which the exposure window is laid upon photosensitive material in readiness for exposure and a state in which the photosensitive material guide means is laid upon a feed path for photosensitive material for loading of photosensitive material.

The invention resides, according to still another aspect, in a photosensitive material feed mechanism for the exposure station of an auto-printer, wherein the mechanism making up the exposure plate station serves to expose photosensitive material successively fed thereto and is adapted to receive an exposure plate withdrawably inserted thereinto. The exposure plate is formed with photosensitive material wedge-aside means. The photosensitive material wedge-aside means functions to wedge photosensitive material aside as the exposure plate is inserted into the exposure station to which photosensitive material is being fed.

Preferably, the photosensitive material wedge-aside means includes an edge formed by obliquely cutting a forward end of the exposure plate or, in addition to such edge, a guide projection formed at a tip of this oblique edge.

Preferably, the exposure station includes a greeting card kit which is adapted to be detachably loaded in the auto-printer.

Preferably, the photosensitive material is photographic paper on which an image that is recorded on an original is to be printed.

Preferably, the exposure plate is a lith plate.

For initially loading of the auto-printer with photosensitive material, a roll of photosensitive material is loaded on appropriate holder means so as to be successively fed therefrom to the respective stations within the auto-printer and then the exposure plate is set to the position at which the photosensitive material guide means is laid upon the feed path for photosensitive material. This allows the forward end of photosensitive material to be guided by said photosensitive material guide means through the exposure station without being caught by the inner structure of this exposure station.

After the photosensitive material has been loaded in such manner, the exposure plate may be set to the position at which the exposure window is laid upon photosensitive material in order to expose photosensitive material to the image recorded on original film through said exposure window.

Leaving photosensitive material loaded in the auto-printer, the exposure plate is withdrawn from the exposure station. Reinsertion of the exposure plate causes the photosensitive material wedge-aside means formed on this exposure plate to wedge photosensitive material aside. In this manner, the exposure plate is never caught by photosensitive material during both insertion and withdrawal of the exposure plate.

DETAILED DESCRIPTION OF THE EMBODIMENT

The photosensitive material feed mechanism for the exposure station of an auto-printer, according to the invention, will be understood more specifically from the following description of the presently preferred embodiment made in reference with the accompanying drawing. It should be understood that the embodiment described hereinafter is assumed to be used with an auto-printer employing photographic paper as the photosensitive material.

Figure 7:
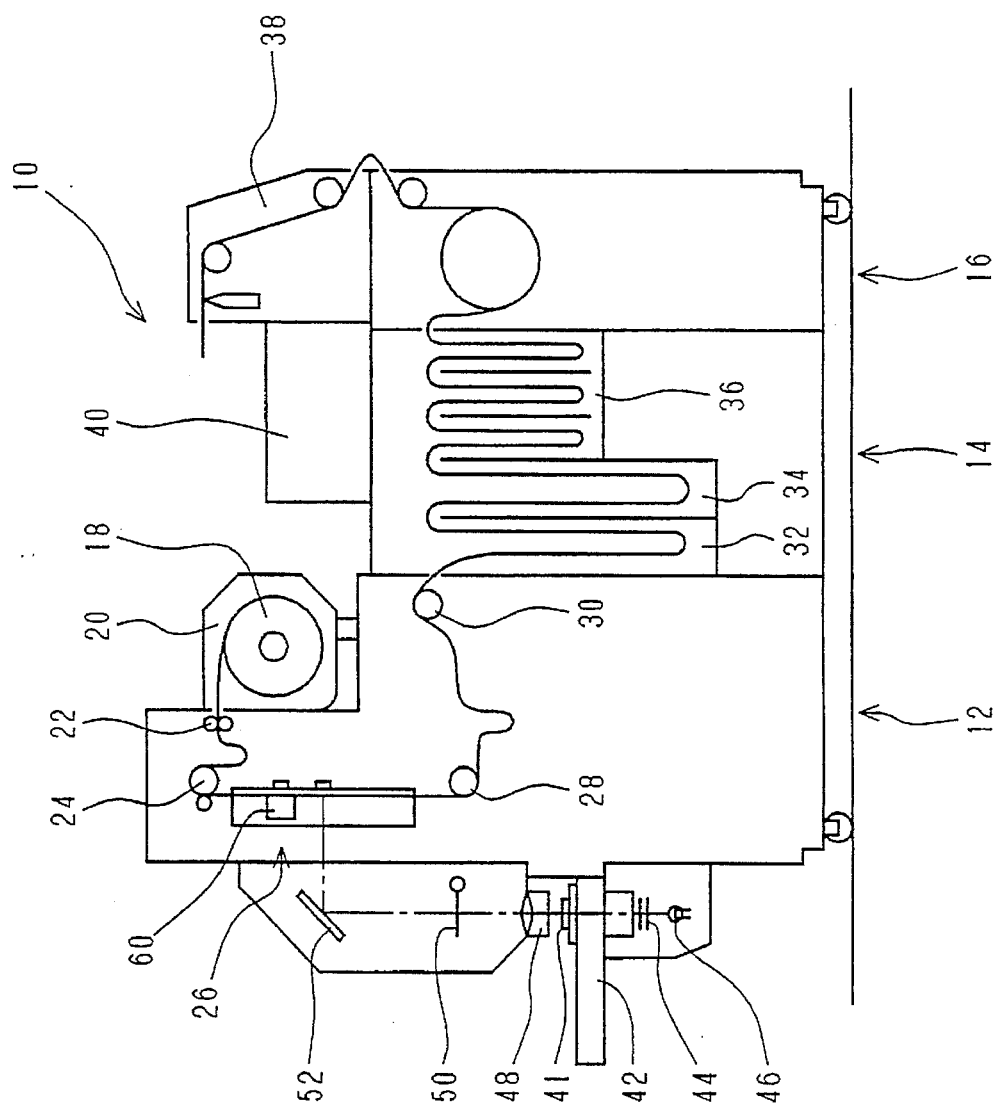
FIG. 7 is it schematic side view illustrating the auto-printer equipped with the mechanism, according to the invention.
Figure 8:
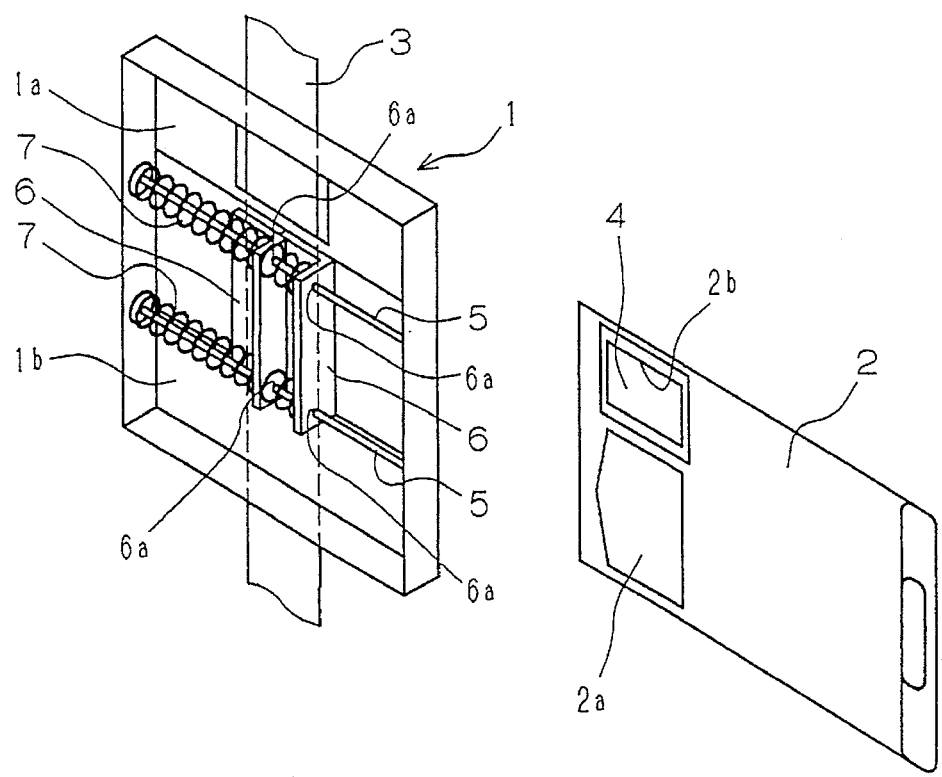
FIG. 8 is a view similar to FIG. 3 illustrating a conventional mechanism used for the same purpose as that of the inventive mechanism during the step of being loaded with photographic paper.
Figure 9:
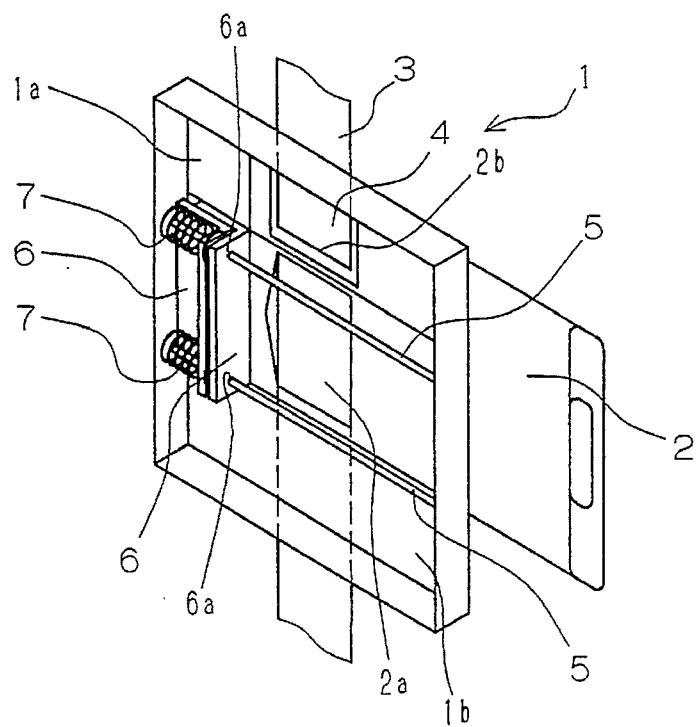
FIG. 9 is a view similar to FIG. 4 showing the convention mechanism in FIG. 8 during the step of exposure.

Referring to FIG. 7, an auto-printer 10 generally includes a printing station 12, a processor station 14, and a dryer station 16. The printing station 12 includes a paper magazine 20 adapted to be loaded with a roll of photosensitive material, such as photographic paper 18. Photographic paper 18 fed from the paper magazine 20 is guided horizontally by a pair of guide rollers 22 and downwardly fed by a feed roller 24. Below the feed roller 24 there is detachably provided a greeting card kit 26, below which there is provided a guide roller 28. Photographic paper 18 guided by the guide roller 28 is then guided by another guide roller 30 into the processor station 14.

The processor station 14 includes a developer station 32, a fixing station 34, and a washing station 36, and followed by the dryer station 16, a cutter station 38, and a sorter station 40.

The auto-printer 10 further includes on its front side an operating table 42 destined to support a photographic original plate, such as negative film 41, below which there are provided a suitable filter 44 and a light-emitting lamp 46. Above the negative film 41 there are provided a lens 48, a shutter 50, and a reflector 52, which form an optical system adapted to direct the light rays emitted from the light-emitting lamp 46 to photographic paper 18 loaded in the greeting card kit 26.

Figure 1:
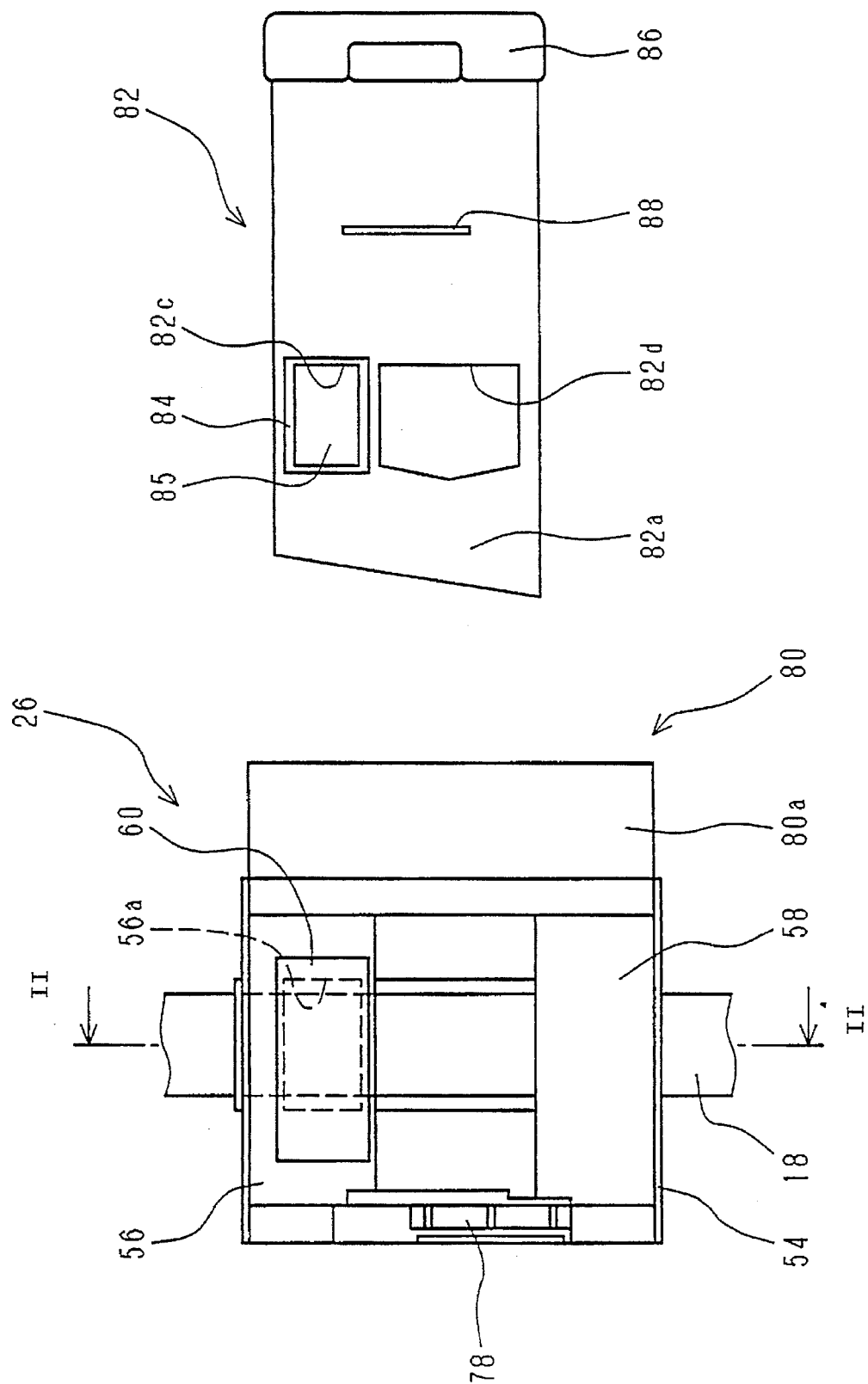
FIG. 1 is a front view of a photosensitive material feed mechanism for the exposure station of an auto-printer constructed in accordance with the invention with a portion removed for clarity.

Referring to FIG. 1, greeting card kit 26 includes a substantially rectangular basic frame 54, a substantially planar upper guide plate 56 mounted on the top of the basic frame 54, and a substantially planar lower guide plate 58 mounted on the bottom of the basic frame 54. The upper guide plate 56 is formed nearly at its central location with a substantially rectangular opening serving as a character zone exposure opening 56a.

Figure 2:
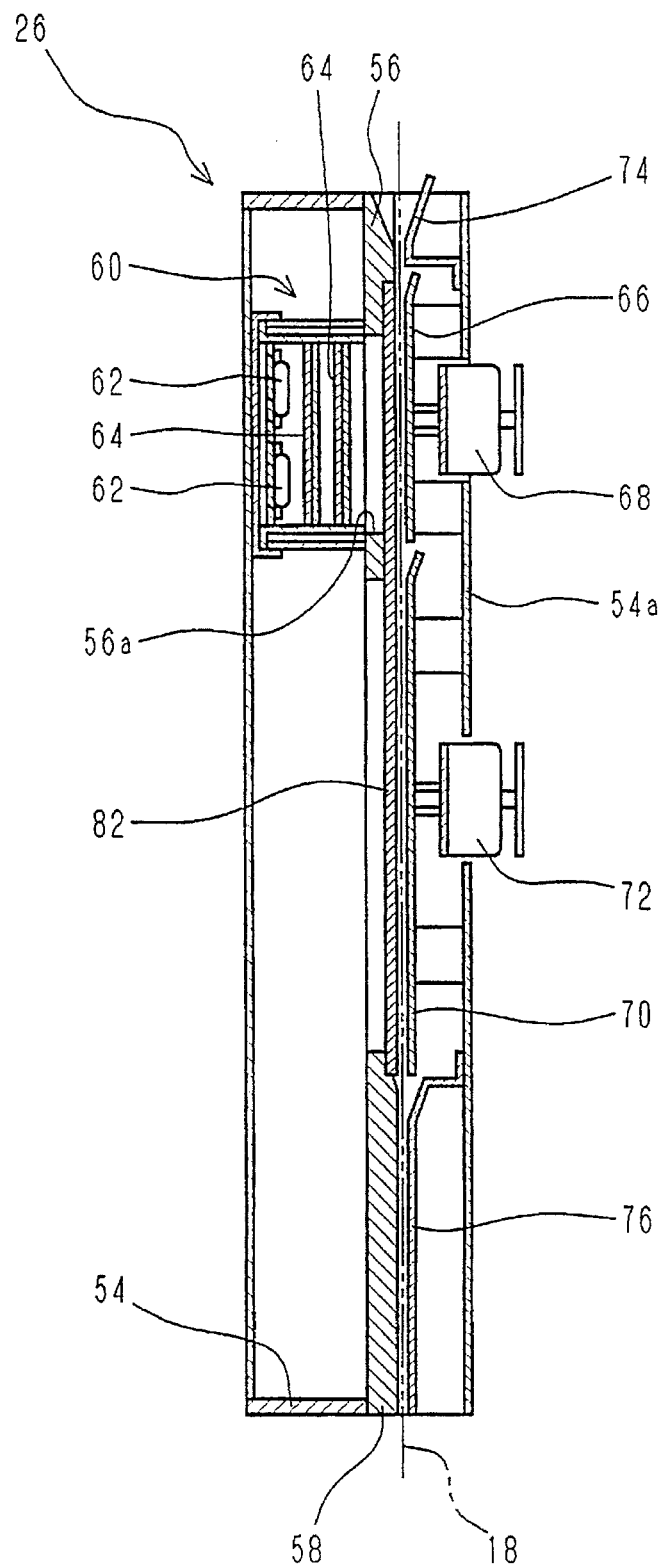
FIG. 2 is a sectional view taken along a line II—II in FIG. 1 with a portion removed to reveal details of the mechanism.

FIG. 2 is a sectional side view of greeting card kit 26 showing the front side of greeting card kit 26 on the left side of the figure. In front of the character zone exposure opening 56a of the upper guide plate 56 there is provided a light source chamber 60 containing therein an appropriate number of light-emitting lamps 62. A diffuser 64 is provided between light-emitting lamps 62 and the character zone exposure opening 56a.

Behind character zone exposure opening 56a there is provided a character zone holding plate 66, which is larger than character zone exposure opening 56a, so that character zone holding plate 66 may be pushed forth by a pusher solenoid 68 provided behind character zone holding plate 66. Pusher solenoid 68 is fixed to a back plate 54a of the basic frame 54 and electrically connected to a control unit (not shown) for auto-printer 10.

Below character zone holding plate 66 there is provided a picture zone holding plate 70 facing a space defined between upper guide plate 56 and lower guide plate 58 so that picture zone holding plate 70 may be pushed forth by a pusher solenoid 72 provided behind this picture zone holding plate 70. Pusher solenoid 72 is also fixed to back plate 54a of basic frame 54 and electrically connected to the control unit (not shown) for the auto-printer 10.

Above the character zone holding plate 66 there is provided an upper holding plate 74 so as to be opposed to upper guide plate 56. Below picture zone holding plate 70 there is provided a lower holding plate 76 so as to be opposed to lower guide plate 58.

Upper guide plate 56, upper holding plate 74, character zone holding plate 66, picture zone holding plate 70, lower guide plate 58, and lower holding plate 76 have their upper portions outwardly bent so as to serve as guide means in order to assure smooth passage of photographic paper 18 through a gap defined between the mutually opposing members, for example, between upper guide plate 56 and upper holding plate 74. The photographic paper is fed without an apprehension that the forward end of the photographic paper might be caught by any one of these members.

Referring to FIG. 1, basic frame 54 is provided on one side thereof with a connector means 78 adapted for operative association with connector means (not shown) provided on auto-printer 10 proper. Thereby, light-emitting lamps 62, pusher solenoids 68, 72, and the other members can be electrically connected to the control unit or the other units of auto-printer 10.

Basic frame 54 is provided on the other side thereof with douser means 80 comprising a douser frame 80a having a longitudinally extending slit 80b and a douser (not shown) mounted on douser frame 80a. Douser means 80 serves to prevent any extraneous light rays from entering greeting card kit 26 even when a lith plate, as will be described later, is inserted into the greeting card kit 26 through this douser means 80.

Figure 6:
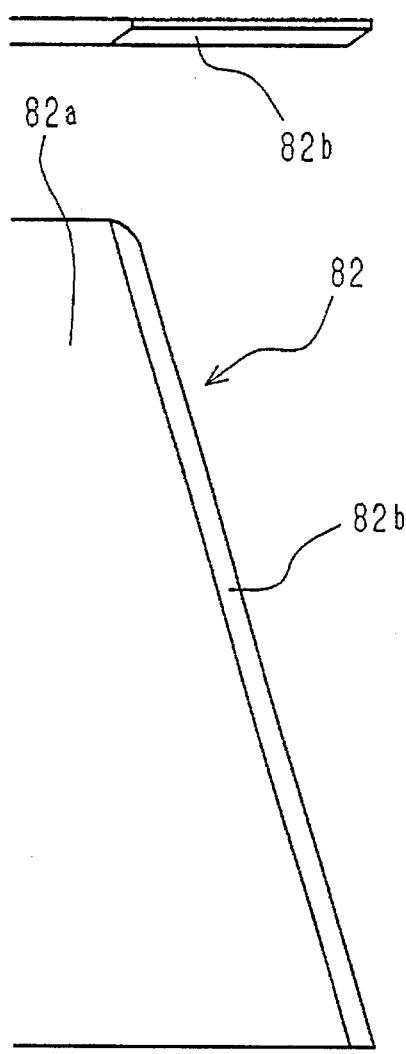
FIGS. 6(a) and 6(b) are partial front and top views, respectively, showing the guide means formed on the lith plate in said mechanism.
Figure 6:
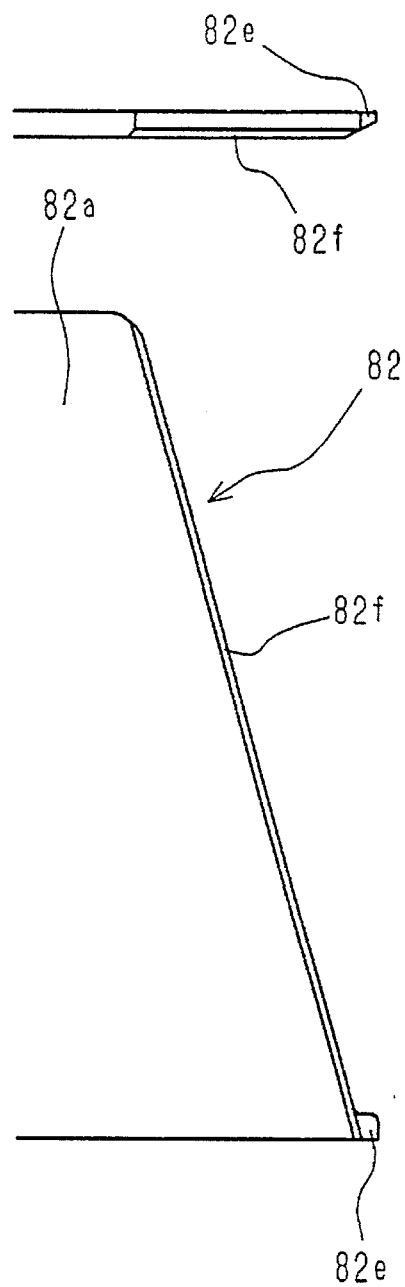

Referring to FIG. 2, the exposure plate in the form of lith plate 82 is withdrawably inserted into a space defined between upper and lower guide plates 56, 58, and character zone and picture zone holding plates 66, 70. Lith plate 82 includes, as will be apparent from FIG. 1, a substantially rectangular planar plate having its forward end, which end is inserted into greeting card kit 26, being obliquely cut so as to form guide means 82a for the photosensitive material. Preferably, the forward edge of this guide means 82a is chamfered, as seen in FIG. 6(a), to form an edge 82b serving to wedge photographic paper aside.

Referring again to FIG. 1, a character zone exposure window 82c, surrounded by a lith film mount frame 84, is formed on the lith plate 82 adjacent guide means 82a. Lith film 85, having a greeting message or the like printed thereon, is mounted on lith film mount frame 84. Lith film 85 is exchangeably used. Below character zone exposure window 82c, lith plate 82 is formed with a picture zone exposure window 82d. A side edge of picture zone exposure window 82d lying adjacent the guide means 82a is notched substantially in a dogleg shape. Lith plate 82 is further formed along its tail end with a grip 86 for an operator. An insertion mark 88 is provided between grip 86 and picture zone exposure window 82d in order to set a depth by which lith plate 82 should be inserted into greeting card kit 26.

A photosensitive material feed mechanism for the exposure station of an auto-printer constructed according to the invention as has been described above functions in the following manner.

To print a photocard, or the like, by auto-printer 10, as shown by FIG. 7, the operator loads the printing station of auto-printer 10 with greeting card kit 26, whereupon connector means 78 of greeting card kit 26 is interconnected with the connector means (not shown) of auto-printer 10 proper and the opening formed in douser means 80 of greeting card kit 26 is exposed externally on a side wall of auto-printer 10.

Figure 3:
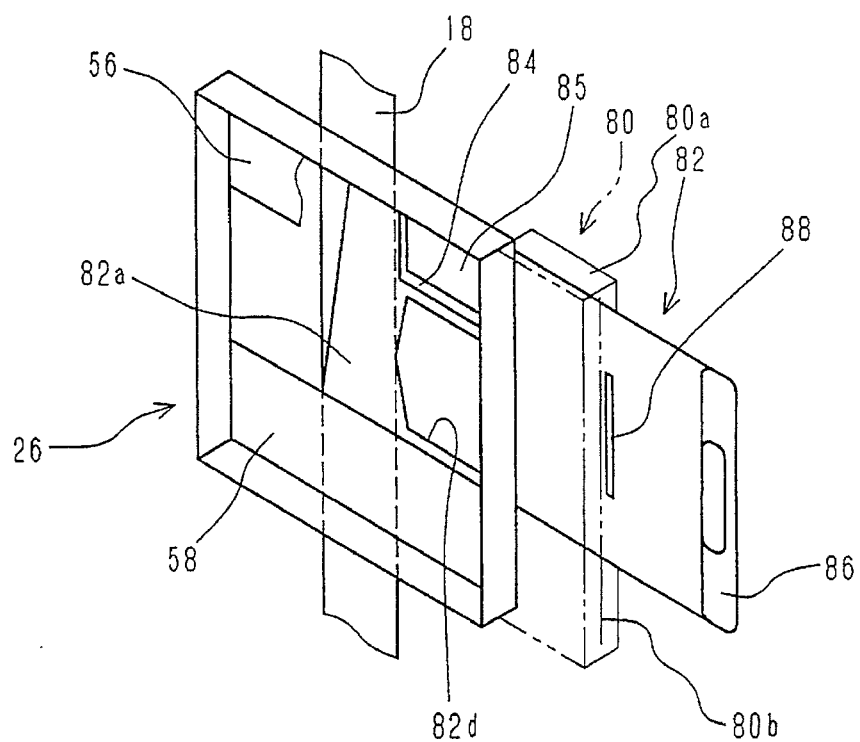
FIG. 3 is a perspective view illustrating the mechanism in FIG. 1 during the step of loading the mechanism with photographic paper with a portion removed for clarity.

Before the operation of printing is started, the operator previously mounts lith film 85 on lith film mount frame 84 of lith plate 82, as shown by FIG. 1, and inserts lith plate 82 into douser means 80 of greeting card kit 26 so that guide means 82a of lith plate 82 is laid upon the feed path for photographic paper 18, as shown by FIG. 3. It should be understood that the insertion mark 88 on lith plate 82 may be registered with the opening edge of douser means 80 to facilitate the above-mentioned position of lith plate 82 by the operator.

Once the operator has loaded paper magazine 20 with a roll of photographic paper 18, as shown by FIG. 7, photographic paper 18 is guided by the pair of guide rollers 22 and is fed via feed roller 24 downward into greeting card kit 26. As will be best seen from FIG. 2, the forward end of photographic paper 18, having been fed downward into the greeting card kit 26, is now guided downward into a space defined between upper guide plate 56 and upper holding plate 74, then into a space defined between guide means 82a of lith plate 82 and character zone holding plate 66. The forward end of photographic paper 18 is further guided into a space defined between guide means 82a and picture zone holding plate 70, then into a space defined between lower guide plate 58 and lower holding plate 76. In this manner, photographic paper 18 is guided downward through greeting card kit 26 without slacking or jamming.

Figure 4:
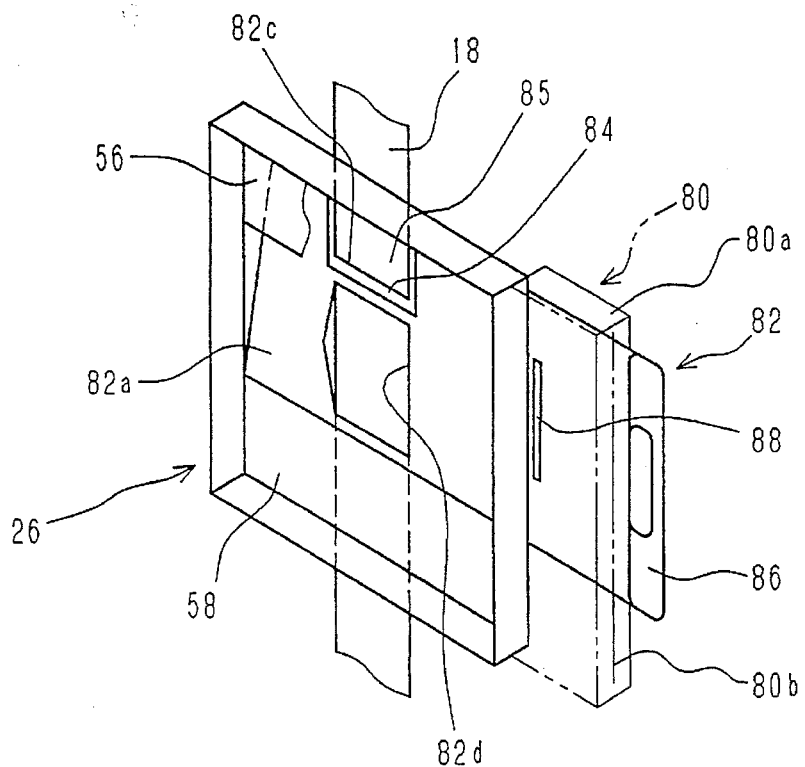
FIG. 4 is a view similar to FIG. 3 illustrating the mechanism during the step of exposure.

To initiate the step of printing after the roll of photographic paper 18 has been loaded, the operator inserts the lith plate further into greeting card kit 26, as shown by FIG. 4, until character zone exposure window 82c, as well as the picture zone exposure window 82d, are properly laid over photographic paper 18. Thereupon, photographic paper 18 is ready for exposure.

For exposure, referring to FIG. 2, pusher solenoid 68, carrying the character zone holding plate 66 mounted thereon, is actuated to move character zone holding plate 66 forward. Character zone holding plate 66 urges, in turn, photographic paper 18 against lith plate 82 whereupon light-emitting lamps 62, provided within light source chamber 60, are energized and the light rays emitted from these lamps 62 are diffused by diffuser 64. Thus, the characters recorded on lith m 85 are printed onto photographic paper 18.

Pusher solenoid 72, carrying picture zone holding plate 70 mounted thereon, is actuated to move picture zone holding plate 70 forward. Picture zone holding plate 70 urges, in turn, photographic paper 18 against lith plate 82. Thereupon, referring to FIG. 7, light-emitting lamp 46 is energized and the picture on negative film 41 is irradiated with the light rays emitted from lamp 46 through filter 44 or the like. Now shutter 50 is properly actuated so that the picture on negative film 41 is printed through lens 48 and picture zone exposure window 82d onto photographic paper 18.

Exposure for each photocard is completed with such series of steps and the sections of photographic paper 18, which have been printed out in the previously described manner, are successively fed to the subsequent stations, such as the processor station 14 and the dryer station 16, where the respective sections are appropriately processed, then to the cutter station 38 in which the respective sections of photographic paper 18 are cut into separate photocards which are then stacked in the sorter station 40.

After a predetermined number of these photocards have been printed, the used lith film 85 may be exchanged with new film to print other photocards. For this exchange, the operation of printing must be interrupted before the used lith plate 82 is withdrawn from greeting card kit 26. In other words, feed of photographic paper 18 must be stopped before lith plate 82 is withdrawn from greeting card kit 26. Without any effective countermeasure, there would be an apprehension that the section of photographic paper 18 laid upon the picture zone exposure window 82d at this moment might be slackened. In consequence, this section of photographic paper 18 might have its forward edge brought in contact with and caught by the corresponding side edge of picture zone exposure window 82d as lith plate 82 is withdrawn from greeting card kit 26. However, the side edge of picture zone exposure window 82d which is adjacent guide means 82a of the lith plate 82, is notched to form a dogleg-shaped edge. In this manner, the section of photographic paper 18 can be guided along this side edge without being caught thereby.

Figure 5:
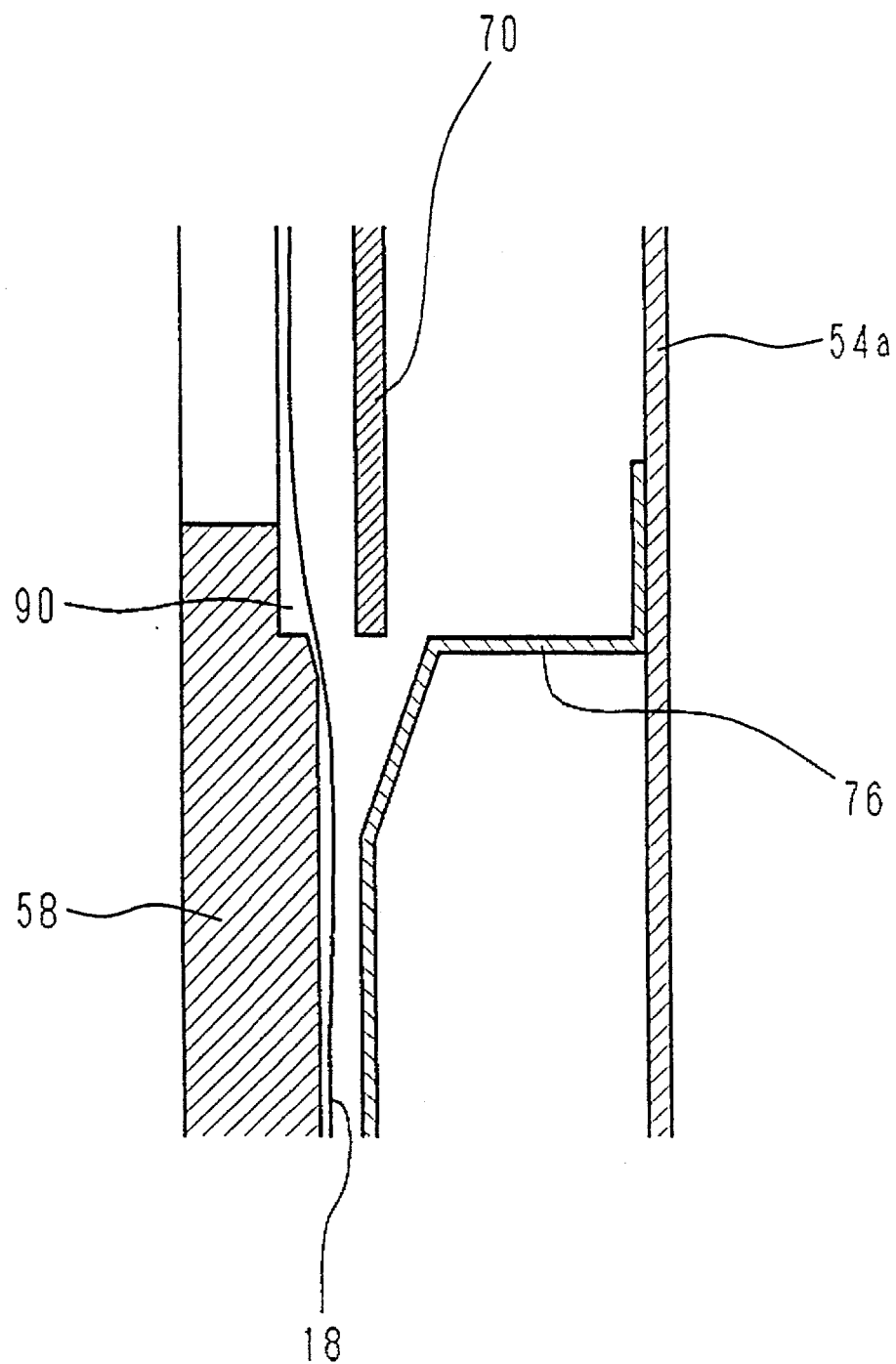
FIG. 5 is an enlargement of the mechanism as viewed in FIG. 2 illustrating the mechanism before the lith plate is inserted thereinto.

Referring again to FIG. 1, used lith film 85 is exchanged with the new one after lith plate 82 has been withdrawn from greeting card kit 26. When lith plate 82 is inserted again into greeting card kit 26, the section of photographic paper 18 being present between upper guide plate 56 and lower guide plate 58 may be sometimes slackened, as shown by FIGS. 2 and 5. Consequently, the forward edge of the lith plate's guide means 82a may contact said section of photographic paper 18. However, the forward edge of lith plate 82 is formed so as to extend obliquely to and, in addition, is machined so as to form the chamfered edge 82b. This chamfered forward edge may, thus, be smoothly inserted into a gap 90 defined between photographic paper 18 and upper guide plate 56 or lower guide plate 58 as lith plate 82 is inserted into greeting card kit 26. Further insertion of the lith plate 82 causes photographic paper 18 to be wedged aside by chamfered oblique edge 82b toward character zone holding plate 66 and picture zone holding plate 70 without being caught by lith plate 82.

While guide means 82a of lith plate 82 is configured, according to the specific embodiment, so as to present the chamfered oblique forward edge 82b, as best seen from FIG. 6(a), any other configuration of guide means 82a may be employed within the scope of the invention. It is only necessary that lith plate 82 can be inserted into gap 90, defined between photographic paper 18 and upper guide plate 56 or lower guide plate 58, without being caught by photographic paper 18 as lith plate 82 is inserted into greeting card kit 26. For example, it is also possible to configure guide means 82a to provide an oblique forward edge 82f formed at its lower end with a guide projection 82e as shown by FIG. 6(b). With such configuration, guide projection 82e cooperates with edge 82f to wedge photographic paper 18 aside. Specifically, guide projection 82e is introduced into gap 90 defined between the upper portion, as viewed in FIG. 5, of lower guide plate 58 and photographic paper 18 as lith plate 82 is inserted into greeting card kit 26. During insertion, edge 82f wedges photographic paper 18 aside toward the picture zone holding plate 70, preventing photographic paper 18 from being damaged.

Also, according to the embodiment as has been described in reference with the accompanying drawing, insertion mark 88 is provided on lith plate 82 at a predetermined position with the help of which the operator can easily set lith plate 82 to a desired position. However, the invention is not limited to such arrangement. For example, it is also possible without departing from the scope of the invention, to provide lower guide plate 58 at an appropriate position with a position sensor by which a position of lith plate 82 is detected. With this modified arrangement, the mechanism can be controlled to perform neither feed nor exposure of photographic paper when it is detected that the lith plate 82 is not properly positioned, thus assuring the reliable operation of printing.

As will be readily appreciated from the foregoing description, the photosensitive material feed mechanism for the exposure station of an auto-printer, according to the invention, allows a single exposure plate to perform many functions, such as guiding of photosensitive material during the step of loading thereof and holding of film during the step of exposure. The exposure plate is formed with the exposure windows and the photosensitive material guide means so that, depending on the insertion depth of the exposure plate, the mechanism can be switched between a state in which photosensitive material is laid upon the exposure windows for operation of exposure and a state in which a feed path for photosensitive material is laid upon the photosensitive material guide means for operation of photosensitive material loading. In other words, the invention eliminates the need for separate provision of a member serving to guide photosensitive material during the step of its loading and a member serving to hold negative film during the step of exposure. In this way, the invention allows the number of parts to be reduced and thereby not only allows both the size and the weight of the auto-printer to be minimized but also allows the manufacturing cost to be reduced.

Furthermore, the invention is advantageous in that the forward end of the exposure plate will not be caught by photosensitive material during insertion of the exposure plate into the greeting card kit because the exposure plate is formed with the photosensitive material wedge-aside means. Consequently, the operation of printing can be smoothly performed without an apprehension that the operation of inserting or withdrawing the exposure plate might be interrupted.

The embodiments of the invention in which an exclusive property or privilege is claimed are defined as follows:

1. A photosensitive material feed mechanism for an exposure station of an auto-printer, said mechanism comprising:
    an exposure station serving to expose photosensitive material successively fed thereto and adapted to receive an exposure plate withdrawably inserted thereinto; and
    said exposure plate being formed with an exposure window and photosensitive material guide means for providing a feed path for photosensitive material in cooperation with said exposure station and for guiding the photosensitive material through said exposure station;
    wherein, by varying an insertion depth of said exposure plate within said exposure station, the mechanism can be switched between an operational state in which photosensitive material is laid upon said exposure window of said exposure plate in readiness for exposure and a loading state in which said photosensitive guide means provides said feed path and guides photosensitive material through said exposure station for loading of photosensitive material.

2. The photosensitive material feed mechanism for the exposure station of an auto-printer according to claim 1, wherein said exposure window formed in the exposure plate includes a character zone exposure window and a picture zone exposure window.

3. The photosensitive material feed mechanism for the exposure station of an auto-printer according to claim 2, wherein the exposure plate is further provided with an insertion mark for distinguishably indicating a position at which the exposure window is laid upon photosensitive material and a position at which the photosensitive material guide means is laid upon photosensitive material.

4. The photosensitive material feed mechanism for the exposure station of an auto-printer according to claim 2, wherein said exposure station includes a greeting card kit adapted to be detachably loaded into the auto-printer.

5. The photosensitive material feed mechanism for the exposure station of an auto-printer according to claim 2, wherein the photosensitive material is photographic paper on which an image recorded on an original is to be printed.

6. The photosensitive material feed mechanism for the exposure station of an auto-printer according to claim 2, wherein the exposure plate is a lith plate.

7. The photosensitive material feed mechanism for the exposure station of an auto-printer according to claim 1, wherein the exposure plate is further provided with an insertion mark for distinguishably indicating a position at which the exposure window is laid upon photosensitive material and a position at which the photosensitive material guide means is laid upon photosensitive material.

8. The photosensitive material feed mechanism for the exposure station of an auto-printer according to claim 7, wherein said exposure station includes a greeting card kit adapted to be detachably loaded into the auto-printer.

9. The photosensitive material feed mechanism for the exposure station of an auto-printer according to claim 7, wherein the photosensitive material is photographic paper on which an image recorded on an original is to be printed.

10. The photosensitive material feed mechanism for the exposure station of an auto-printer according to claim 7, wherein the exposure plate is a lith plate.

11. The photosensitive material feed mechanism for the exposure station of an auto-printer according to claim 1, wherein said exposure station includes a greeting card kit adapted to be detachably loaded into the auto-printer.

12. The photosensitive material feed mechanism for the exposure station of an auto-printer according to claim 11, wherein the photosensitive material is photographic paper on which an image recorded on an original is to be printed.

13. The photosensitive material feed mechanism for the exposure station of an auto-printer according to claim 11, wherein the exposure plate is a lith plate.

14. The photosensitive material feed mechanism for the exposure station of an auto-printer according to claim 1, wherein the photosensitive material is photographic paper on which an image recorded on an original is to be printed.

15. The photosensitive material feed mechanism for the exposure station of an auto-printer according to claim 14, wherein the exposure plate is a lith plate.

16. The photosensitive material feed mechanism for the exposure station of an auto-printer according to claim 1, wherein the exposure plate is a lith plate.

17. The photosensitive material feed mechanism for the exposure station of an auto-printer according to claim 1, wherein said exposure plate is formed of a flat substrate with said exposure window provided through said flat substrate, and wherein a portion of said flat substrate lying between said exposure window and an insertion end of said exposure plate serves as said photosensitive material guide means.

18. The photosensitive material feed mechanism for the exposure station of an auto-printer according to claim 1, wherein said exposure station also includes an exposure window, when the mechanism is in said operational state, said exposure plate is inserted into said exposure station at such a depth that said exposure window provided in said exposure plate is aligned with the exposure window provided in said exposure station, and when the mechanism is in said loading state, said exposure plate is inserted into said exposure station at such a depth that said photosensitive material guide means provided on said exposure plate is aligned with the exposure window provided in said exposure station.

19. A photosensitive material feed mechanism for an exposure station of an auto-printer, said mechanism comprising:
    an exposure station serving to expose photosensitive material successfully fed thereto and adapted to receive an exposure plate withdrawably inserted thereinto;
    said exposure plate including:
        an exposure window,
        photosensitive material guide means for providing a feed path for photosensitive material in cooperation with said exposure station and for guiding the photosensitive material through said exposure station, and
        photosensitive material wedge-aside means for wedging photosensitive material aside as said exposure plate is inserted into said exposure station to which photosensitive material is being fed,
    wherein, by varying an insertion depth of said exposure plate within said exposure station, the mechanism can be switched between an operational state in which photosensitive material is laid upon said exposure window in readiness for exposure and a loading state in which said photosensitive guide means provides said feed path and guides photosensitive material through said exposure station for loading of photosensitive material.

20. The photosensitive material feed mechanism for the exposure station of an auto-printer according to claim 19, wherein the photosensitive material wedge-aside means includes an edge formed by obliquely cutting and chamfering a forward end of the exposure plate.

21. The photosensitive material feed mechanism for the exposure station of an auto-printer according to claim 20, wherein said exposure station includes a greeting card kit adapted to be detachably loaded into the auto-printer.

22. The photosensitive material feed mechanism for the exposure station of an auto-printer according to claim 20, wherein the photosensitive material is photographic paper on which an image recorded on an original is to be printed.

23. The photosensitive material feed mechanism for the exposure station of an auto-printer according to claim 20, wherein the exposure plate is a lith plate.

24. The photosensitive material feed mechanism for the exposure station of an auto-printer according to claim 19, wherein the photosensitive material wedge-aside means includes a combination of an edge formed by obliquely cutting and chamfering a forward end of the exposure plate and a guide projection formed at a tip of this oblique edge.

25. The photosensitive material feed mechanism for the exposure station of an auto-printer according to claim 24, wherein said exposure station includes a greeting card kit adapted to be detachably loaded into the auto-printer.

26. The photosensitive material feed mechanism for the exposure station of an auto-printer according to claim 24, wherein the photosensitive material is photographic paper on which an image recorded on an original is to be printed.

27. The photosensitive material feed mechanism for the exposure station of an auto-printer according to claim 24, wherein the exposure plate is a lith plate.

28. The photosensitive material feed mechanism for the exposure station of an auto-printer according to claim 19, wherein said exposure window formed in the exposure plate includes a character zone exposure window and a picture zone exposure window.

29. The photosensitive material feed mechanism for the exposure station of an auto-printer according to claim 19, wherein the exposure plate is further provided with an insertion mark for distinguishably indicating a position at which the exposure window is laid upon photosensitive material and a position at which the photosensitive material guide means is laid upon photosensitive material.

30. The photosensitive material feed mechanism for the exposure station of an auto-printer according to claim 19, wherein said exposure station includes a greeting card kit adapted to be detachably loaded into the auto-printer.

31. The photosensitive material feed mechanism for the exposure station of an auto-printer according to claim 19, wherein the photosensitive material is photographic paper on which an image recorded on an original is to be printed.

32. The photosensitive material feed mechanism for the exposure station of an auto-printer according to claim 19, wherein the exposure plate is a lith plate.

33. A photosensitive material feed mechanism for the exposure station of an auto-printer, said mechanism comprising:

an exposure station serving to expose photosensitive material successively fed thereto and adapted to receive an exposure plate withdrawably inserted thereinto;

said exposure plate being formed with photosensitive material wedge-aside means; and said photosensitive material wedge-aside means functioning to wedge photosensitive material aside as the exposure plate is inserted into the exposure station to which photosensitive material is being fed.

34. The photosensitive material feed mechanism for the exposure station of an auto-printer according to claim 33, wherein the photosensitive material wedge-aside means includes an edge formed by obliquely cutting and chamfering a forward end of the exposure plate.

35. The photosensitive material feed mechanism for the exposure station of an auto-printer according to claim 33, wherein the photosensitive material wedge-aside means includes a combination of an edge formed by obliquely cutting and chamfering a forward end of the exposure plate and a guide projection formed at a tip of this oblique edge.

36. The photosensitive material feed mechanism for the exposure station of an auto-printer according to claim 33, wherein said exposure station includes a greeting card kit adapted to be detachably loaded into the auto-printer.

37. The photosensitive material feed mechanism for the exposure station of an auto-printer according to claim 33, wherein the photosensitive material is photographic paper on which an image recorded on an original is to be printed.

38. The photosensitive material feed mechanism for the exposure station of an auto-printer according to claim 33, wherein the exposure plate is a lith plate.

39. The photosensitive material feed mechanism for the exposure station of an auto-printer according to claim 33, wherein said wedge-aside means is provided along the entire length of an insertion end of said exposure plate.

* * * * *

UNITED STATES PATENT AND TRADEMARK OFFICE
CERTIFICATE OF CORRECTION

PATENT NO. : 5,661,543
DATED : August 26, 1997
INVENTOR(S) : Mamoru Ogasawara et al.

It is certified that error appears in the above-identified patent and that said Letters Patent is hereby corrected as shown below:

On the title page, item [54] and column 1, line 2:

"MECHANSIM" should be --MECHANISM--.

Column 7, Line 7;

"m" should be --film--.

Signed and Sealed this

Seventeenth Day of February, 1998

*Attest:*

BRUCE LEHMAN

*Attesting Officer*     *Commissioner of Patents and Trademarks*